United States Patent
Kida et al.

(10) Patent No.: US 7,932,901 B2
(45) Date of Patent: *Apr. 26, 2011

(54) TIMING GENERATING CIRCUIT, DISPLAY APPARATUS, AND PORTABLE TERMINAL

(75) Inventors: Yoshitoshi Kida, Kanagawa (JP);
Yoshiharu Nakajima, Kanagawa (JP);
Toshikazu Maekawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

This patent is subject to a terminal disclaimer.

(21) Appl. No.: 11/880,699

(22) Filed: Jul. 24, 2007

(65) Prior Publication Data

US 2007/0262975 A1 Nov. 15, 2007

Related U.S. Application Data

(63) Continuation of application No. 10/484,994, filed as application No. PCT/JP03/06522 on May 26, 2003, now Pat. No. 7,250,941.

(30) Foreign Application Priority Data

May 30, 2002 (JP) ................ P2002-157053

(51) Int. Cl.
*G09G 5/00* (2006.01)
(52) U.S. Cl. ........... 345/204; 345/213; 345/100; 345/99
(58) Field of Classification Search .............. 345/94–96, 345/98–100, 204, 208–210
See application file for complete search history.

(56) References Cited

U.S. PATENT DOCUMENTS

| 6,550,013 | B1 | 4/2003 | Gervais et al. |
| 7,250,941 | B2 * | 7/2007 | Kida et al. .............. 345/204 |
| 2002/0190971 | A1 | 12/2002 | Nakamura et al. |

FOREIGN PATENT DOCUMENTS

| JP | 08-305616 | 11/1996 |
| JP | 09-080382 | 3/1997 |
| JP | 09-127915 | 5/1997 |
| JP | 2001-092403 | 4/2001 |
| JP | 2001-265289 | 9/2001 |
| JP | 2002-116424 | 4/2002 |

* cited by examiner

*Primary Examiner* — Bipin Shalwala
*Assistant Examiner* — Steven E Holton
(74) *Attorney, Agent, or Firm* — Robert J. Depke; Rockey, Depke & Lyons, LLC (57) ABSTRACT

A timing generating circuit with low power consumption and a small layout area, a display apparatus including the timing generating circuit as one peripheral driving circuit, and a portable terminal including the display apparatus as a display output section are provided. In the timing generating circuit, which is formed on an insulating substrate and generates output pulses SRFF1out to SRFFnout having different frequencies based on a master clock MCK, a clock generating circuit (11) generates an operating clock having a lower frequency than the master clock MCK frequency. Then, a counter section (12) operates based on this operating clock and successively outputs shifted pulses S/R1out to S/Rmount from shift registers (121-1) to (121-m). An output pulse generating section (13) generates output pulses SF1out to SFnout based on combinations of the shifted pulses S/R1out to S/Rmount.

6 Claims, 7 Drawing Sheets

TIMING GENERATING CIRCUIT, DISPLAY APPARATUS, AND PORTABLE TERMINAL

The subject matter of application Ser. No. 10/484,994, is incorporated herein by reference. The present application is a Continuation of U.S. Ser. No. 10/484,994, filed Jan. 27, 2004, now U.S. Pat. No. 7,250,941 which is a 371 U.S. National Stage filing of PCT application number PCT/JP03/06522 filed on May 26, 2003, which claims priority to Japanese Patent Application No. JP2002-157053 filed May 30, 2002. The present application claims priority to these previously filed applications.

TECHNICAL FIELD

The present invention relates to a timing generating circuit, a display apparatus, and a portable terminal and, particularly, to a timing generating circuit formed including transistors having wide variations in their device properties on an insulating substrate, a display apparatus including this timing generating circuit as one peripheral driving circuit, and a portable terminal including this display apparatus as a display screen component.

BACKGROUND ART

Figure 6:
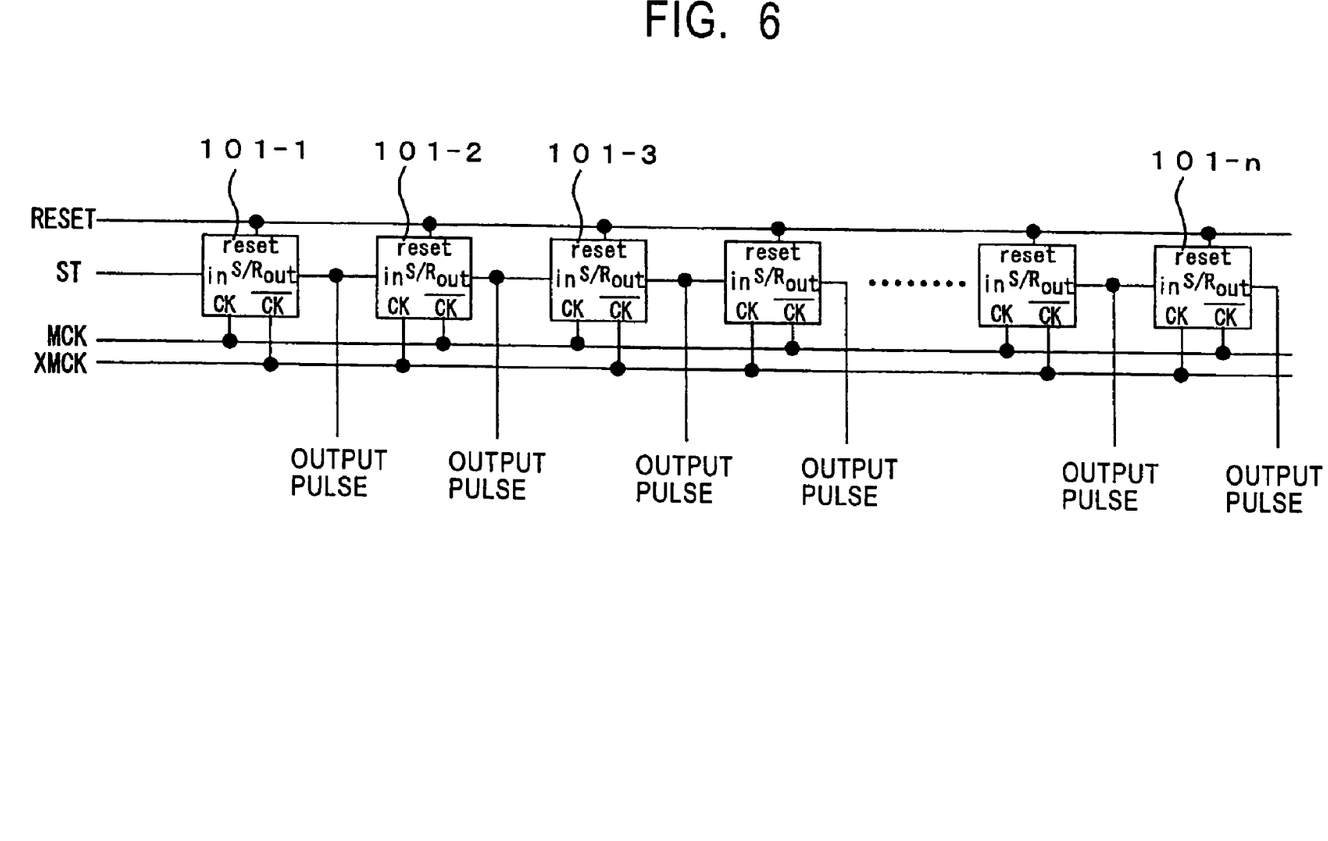
FIG. 6 is a circuit diagram showing a known timing generating circuit.

A timing generating circuit having a counter circuit structure shown in FIG. 6 is known. Specifically, this known timing generating circuit includes a counter circuit in which n stages of shift registers (S/R) 101-1 to 101-n are cascaded. As each CK input to the shift registers 101-1 to 101-n, a master clock MCK and its negative-phase clock XMCK are provided. When a start pulse ST is input to the first stage shift register 101-1, the shift registers 101-1 to 101-n perform shift operations in synchronism with the master clock MCK and XMCK to output shifted pulses as output pulses from each output terminal thereof.

If the above described timing generating circuit is formed including transistors having wide variations in their device properties and a high threshold Vth, for example, thin film transistors (TFTs) on an insulating substrate, such as a glass substrate, a matter of concern is that high (fast) frequencies in the master clock MCK and XMCK may cause problems in the counter operation (leave no operating margin). If the counter operates with such a high frequency, the power consumption in the timing generating circuit would increase. Further, a large layout area is needed since shift registers are required depending on the period of the output pulses and the TFTs have a larger process rule compared with the case where silicon is used.

Figure 7:
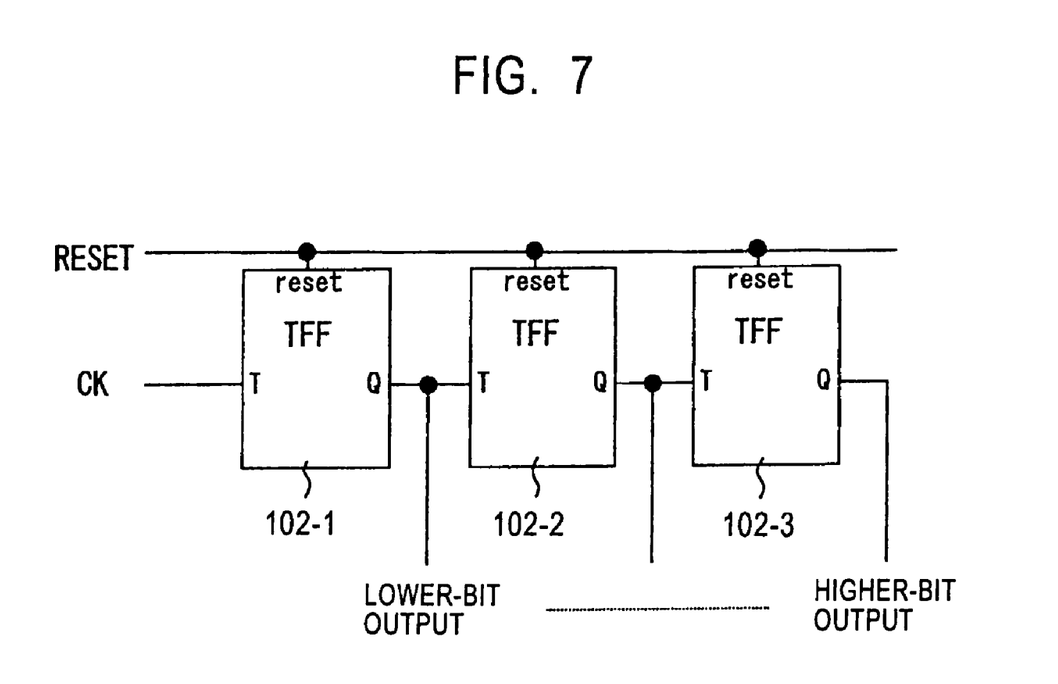
FIG. 7 is a circuit diagram of another known timing generating circuit.

FIG. 7 shows the circuit structure of another known timing generating circuit. This timing generating circuit may have an asynchronous counter circuit structure including three T-type flip-flops (hereinafter referred to as TFF) 102-1, 102-2, and 102-3 in which a lower-bit output from one TFF is a higher-bit input to another TFF. This known timing generating circuit, however, may malfunction due to delay variations in the TFFs 102-1, 102-2, and 102-3.

In view of the above mentioned problems, it is an object of the present invention to provide a timing generating circuit with low power consumption and small layout area even when transistors having wide variations in their device properties and a large process rule are used, a display apparatus including this timing generating circuit as one peripheral driving circuit, and a portable terminal including this display apparatus as a display output component.

DISCLOSURE OF INVENTION

The present invention provides a timing generating circuit having clock generating means formed on an insulating substrate for generating an operating clock based on a master clock input from the outside, the operating clock having a lower frequency than the master clock frequency; and signal generating means for generating multiple timing signals having different frequencies based on the operating clock generated by the clock generating means. This timing generating circuit is used in a display apparatus. In the display apparatus, the timing generating circuit is disposed on the same transparent insulating substrate as a display section and generates multiple timing signals having different frequencies required for driving the display section. The display apparatus including this timing generating circuit is disposed in a portable terminal, typified by a personal digital assistant (PDA) and a mobile phone, as a display screen component thereof.

In the above described timing generating circuit, the display apparatus including this timing generating circuit as one peripheral circuit, or the portable terminal including this display apparatus disposed therein as the display screen component, firstly, the clock generating means converts the master clock into the operating clock having a lower frequency than the master clock frequency, and then the signal generating means generates the multiple timing signals based on the operating clock having the lower frequency. This enables a slow operating speed, thus allowing stable operation and reduced power consumption. Further, since shift registers are not required depending on the period of the timing signals, the structure has a small number of stages. Therefore, a small layout area is achieved, even when transistors having wide variations in their device properties and a large process rule are used for forming circuits.

BEST MODE FOR CARRYING OUT THE INVENTION

An embodiment of the present invention will be illustrated with reference to the drawings.

Figure 1:
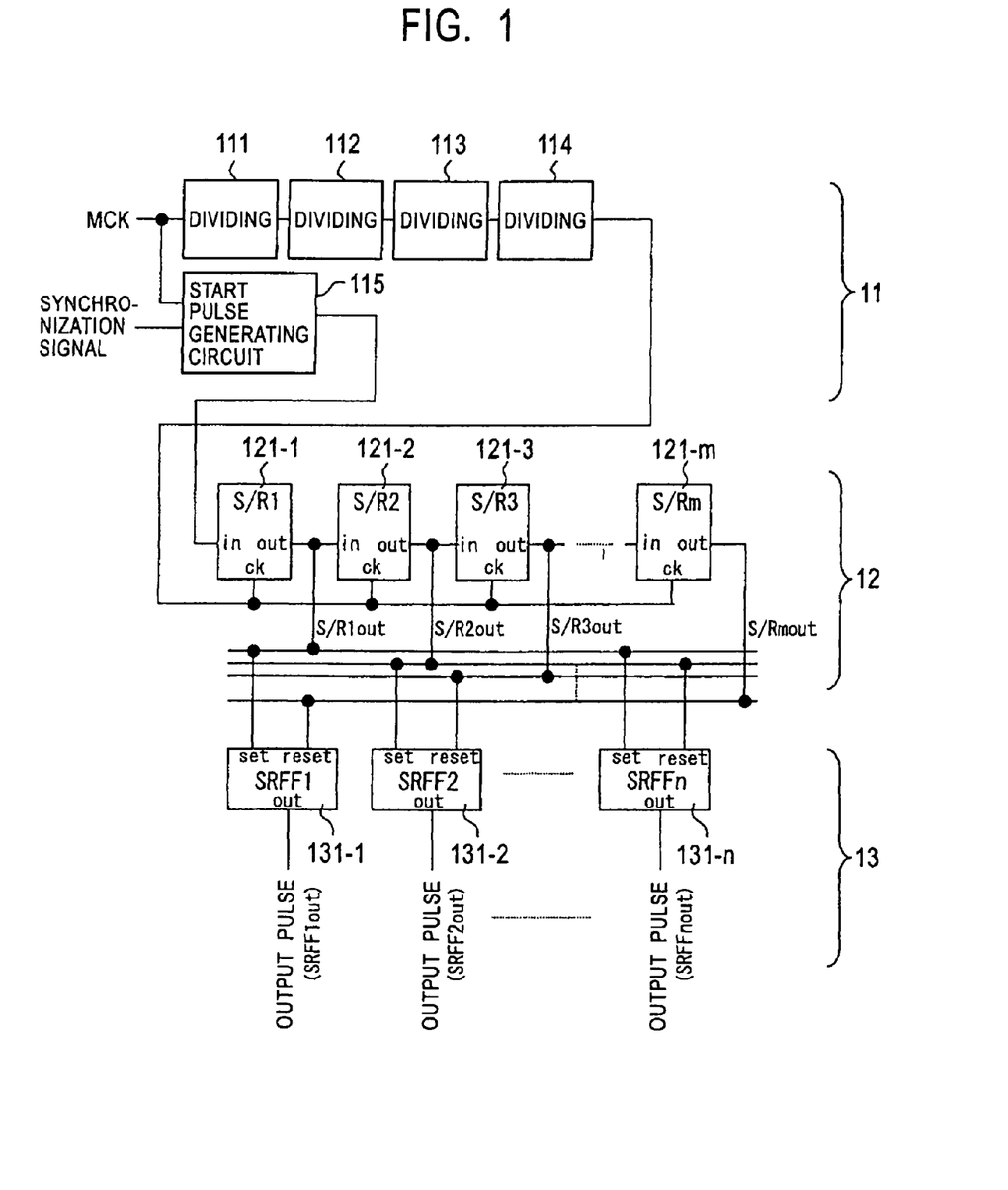
FIG. 1 is a block diagram showing a typical structure of a timing generating circuit of an embodiment of the present invention.

FIG. 1 is a block diagram of the timing generating circuit of the embodiment of the present invention. As is apparent from FIG. 1, the timing generating circuit of this embodiment has a clock generating section 11, a counter section 12, and an output pulse generating section 13. It is based on the premise that the timing generating circuit is formed including transistors, for example, TFTs, that have wide variations in their device properties and a large process rule on an insulating substrate, such as a glass substrate.

The clock generating section 11 may include four dividing circuits 111 to 114 and a start pulse generating circuit 115. The four dividing circuits 111 to 114 are cascaded and divide a master clock MCK input to the first stage thereof to generate an operating clock having a lower frequency than the master clock MCK frequency. The start pulse generating circuit 115 generates a start pulse ST every 1H period (H is a horizontal period) based on, for example, a horizontal synchronization signal Hsync and the master clock MCK.

The counter section 12 includes m shift registers (S/R) 121-1 to 121-m, which are cascaded. The operating clock generated in the clock generating section 11 is input to the shift registers 121-1 to 121-m as each ck input. When the start pulse ST generated in the start pulse generating circuit 115 is input to the first stage shift register 121-1, the shift registers 121-1 to 121-m perform shift operations in synchronism with the operating clock to successively output shifted pulses from each output terminal thereof.

The output pulse generating section 13 includes n set reset (SR) flip-flops (hereinafter referred to as SRFF) 131-1 to 131-n. The shifted pulses output from the shift registers 121-1 to 121-m in the counter section 12 are supplied to the SRFFs 131-1 to 131-n in any combination as each set input and reset input thereof.

Examples of such a combination are as follows: for the SRFF 131-1, a shifted pulse from the shift register 121-1 as a set input and a shifted pulse from the shift register 121-m as a reset input; and for the SRFF 131-2, a shifted pulse from the shift register 121-2 as a set input and a shifted pulse from the shift register 121-3 as a reset input. Examples for the SRFFs 131-3 to 131-n−1 are omitted here. For the SRFF 131-n, a shifted pulse from the shift register 121-1 as a set input and a shifted pulse from the shift register 121-2 as a reset input may be provided.

The counter section 12 and the output pulse generating section (signal generating section) 13 constitute signal generating means for generating multiple timing signals (output pulses) having different frequencies based on the operating clock generated by the clock generating section 11.

Figure 2:
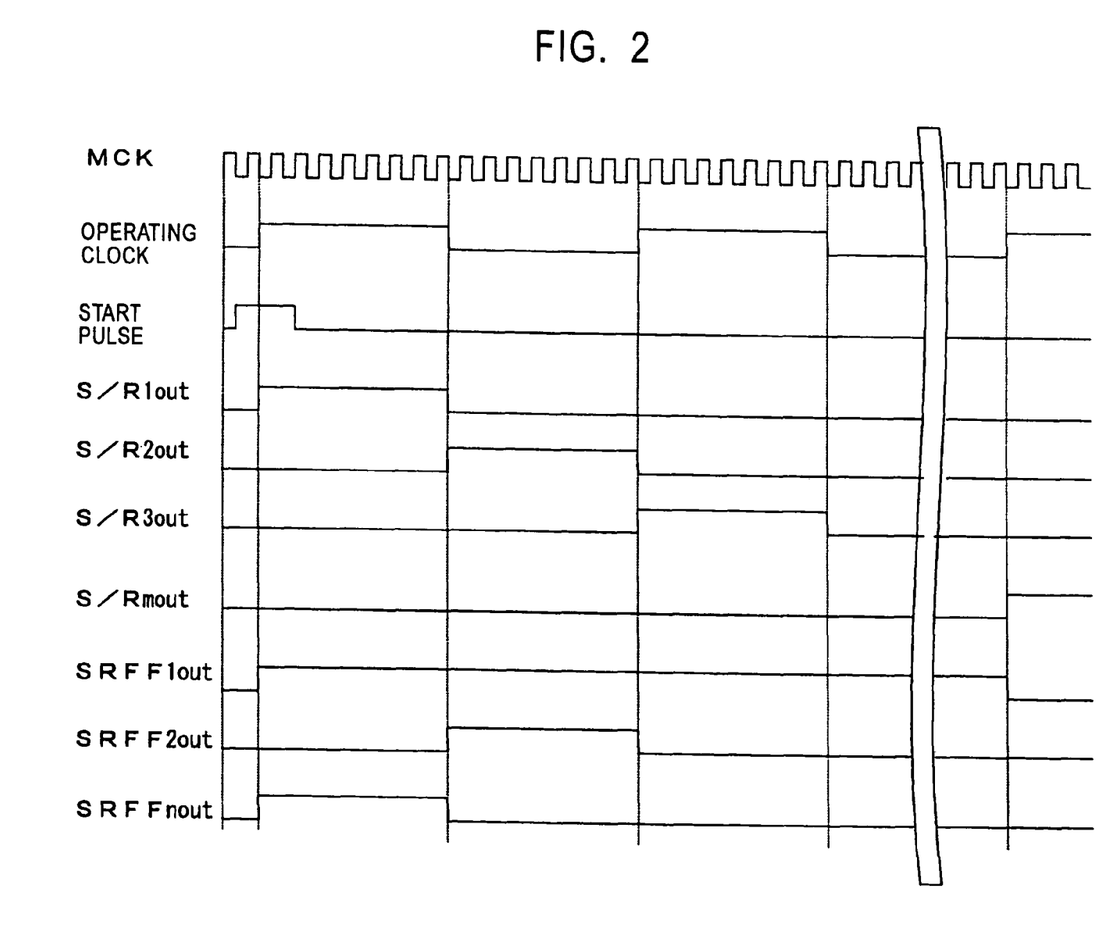
FIG. 2 is a timing chart for explanation of the circuit operation of the timing generating circuit of the embodiment.

The circuit operation of the timing generating circuit of the embodiment having the above described arrangement will now be described with reference to the timing chart shown in FIG. 2.

In the clock generating section 11, the dividing circuits 111 to 114 generate the operating clock having a lower (slower) frequency than the master clock MCK frequency, specifically, one eighth of the master clock MCK frequency, by dividing the master clock MCK four times. The start pulse generating circuit 115 generates the start pulse whose pulse width is, for example, five times wider than that of the master clock MCK every 1H period in synchronism with the horizontal synchronization signal Hsync.

Upon input of the start pulse to the first stage shift register 121-1, the counter section 12 performs count operations and successively outputs shifted pulses S/R1out, S/R2out, . . . , S/Rmout, each of whose pulse width is the same as that of the operating clock, in synchronism with the operating clock generated by the clock generating section 11.

In the output pulse generating section 13, the SRFF 131-1 is set with the shifted pulse S/R1out from the shift register 121-1 and is reset with the shifted pulse S/Rmout from the shift register 121-m, thereby generating an output pulse SRFF1out, which is at a high level for the duration between the rise time of the shifted pulse S/R1out and that of the shifted pulse S/Rmout. The SRFF 131-2 is set with the shifted pulse S/R2out from the shift register 121-2 and is reset with the shifted pulse S/R3out from the shift register 121-3, thereby generating an output pulse SRFF2out, which is at a high level for the duration between the rise time of the shifted pulse S/R2out and that of the shifted pulse S/R3out.

The explanation of the SRFFs 131-3 to 131-n−1 is omitted. The SRFF 131-n is set with the shifted pulse S/R1out from the shift register 121-1 and is reset with the shifted pulse S/R2out from the shift register 121-2, thereby generating an output pulse SRFFnout, which is at a high level for the duration between the rise time of the shifted pulse S/R1out and that of the shifted pulse S/R2out.

As discussed above, the timing generating circuit, which is formed on the insulating substrate and generates the multiple output pulses SRFF1out to SRFFnout having different frequencies based on the master clock MCK, firstly generates the operating clock having the lower frequency than the master clock MCK frequency, and then generates the output pulses SRFF1out to SRFFnout based on the generated operating clock having the lower frequency. This enables a slow operating speed in the counter section 12, thus allowing a wide operating margin in the counter section 12, stable operation, and also reduced power consumption. Moreover, in this embodiment, since the start pulse ST is generated every 1H period, the output pulses having any generated timing can be generated every 1H period.

Since shift registers are not required depending on the period of the output pulses, the counter section 12 has the small number of stages. Therefore, a small layout area is achieved even when TFTs that have wide variations in their device properties and a large process rule are used for forming circuits on the insulating substrate. The operating clock is generated by dividing the master clock MCK four times in this embodiment so that both the power consumption and the layout area are reduced to about a quarter, respectively, as compared with the case where there is no dividing.

This embodiment is described with such a structure in which the operating clock is generated by dividing the master clock MCK four times, but it is not limited to division by four. Generating an operating clock having a further lower frequency by increasing the number of divisions achieves larger reductions in the power consumption and the layout area.

The start pulse ST is generated every 1H period in synchronism with the horizontal synchronization signal Hsync in this embodiment, but the start pulse ST may be generated every 1V period (V is a vertical period) in synchronism with a vertical synchronization signal Vsync. In this case, the output pulses having any generated timing can be generated every 1V period.

The timing generating circuit according to the above embodiment is suitable for use as a timing generator that generates various timing signals required for driving a display section based on a master clock MCK externally input to the substrate of, for example, a driving-circuit-integrated display apparatus, which peripheral driving circuits are integrally formed on the same transparent insulating substrate as the display section having a matrix of pixels.

[Application]

Figure 3:
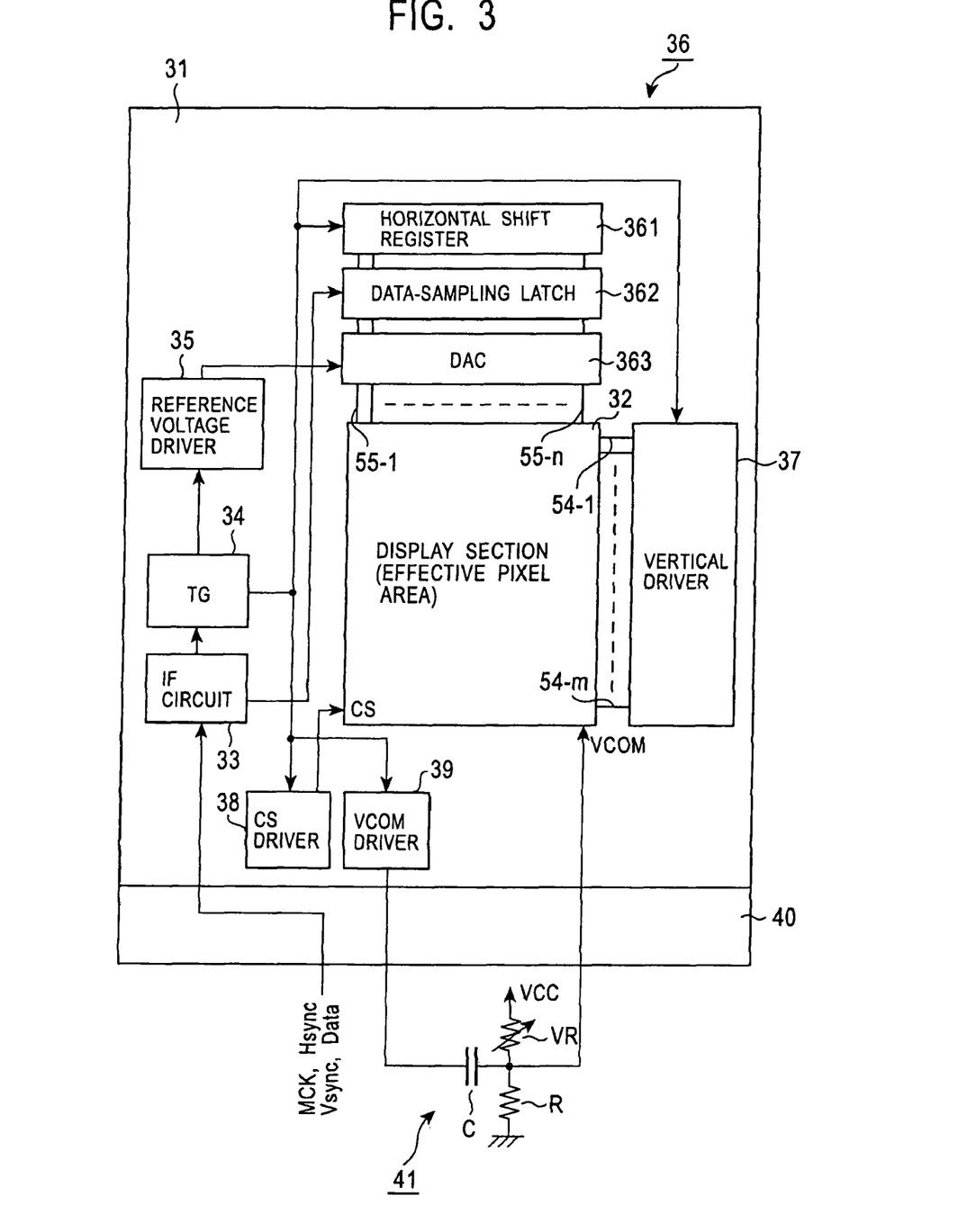
FIG. 3 is a block diagram showing a typical structure of a liquid crystal display apparatus of the present invention.

FIG. 3 is a block diagram showing a typical structure of the display apparatus, for example, a liquid crystal display apparatus, of the present invention. Referring to FIG. 3, a display section (pixel section) 32 having a matrix of pixels is formed on a transparent insulating substrate, for example, a glass substrate 31. The glass substrate 31 faces another glass substrate at a predetermined spacing. These substrates contain a liquid crystal material therebetween, thereby constituting a display panel (LCD panel).

Figure 4:
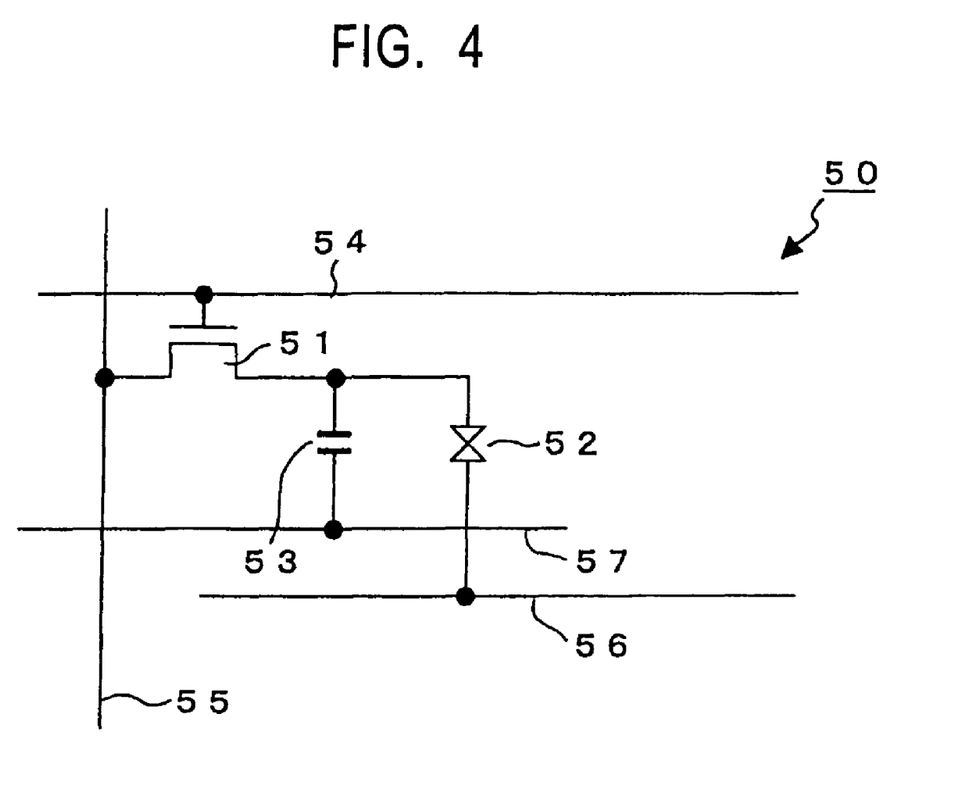
FIG. 4 is a circuit diagram showing a typical pixel structure.

FIG. 4 is a circuit diagram showing a typical structure of each pixel of the display section 32. A pixel 50 of the matrix of pixels includes a thin film transistor (TFT) 51, which is a pixel transistor, a liquid crystal cell 52, whose pixel electrode is connected to a drain electrode of the TFT 51, and a storage capacitor 53, one electrode thereof being connected to the drain electrode of the TFT 51. The liquid crystal cell 52 functions as a liquid crystal capacitance generated between the pixel electrode and the opposite electrode.

In this pixel structure, a gate electrode of the TFT 51 is connected to a gate line (scanning line) 54, while a source electrode of the TFT 51 is connected to a data line (signal line) 55. The opposite electrode of the liquid crystal cell 52 is connected to a VCOM line 56, which is common to each pixel. Through the VCOM line 56, a common voltage VCOM (VCOM electric potential) is supplied to the opposite electrode of the liquid crystal cell 52. This supply is common to each pixel. The other electrode (the terminal of the opposite electrode) of the storage capacitor 53 is connected to a CS line 57, which is common to each pixel.

When 1H (H is a horizontal period) inversion driving or 1F (F is a field period) inversion driving is performed, a display signal written in each pixel is inverted relative to the VCOM electric potential. When VCOM inversion driving, which inverts the polarity of the VCOM electric potential every 1H or 1F, is used in combination with the 1H inversion or the 1F inversion, the polarity of a CS electric potential supplied to the CS line 57 is inverted in synchronism with the VCOM electric potential. The liquid crystal display apparatus according to the present invention is not limited to the VCOM inversion driving.

Referring back to FIG. 3, an interface (IF) circuit 33, a timing generator (TG) 34, and a reference voltage driver 35 may be disposed on the glass substrate 31, which the display section 32 is disposed thereon, to the left of the display section 32. A horizontal driver 36 may be disposed on the glass substrate 31 above the display section 32. A vertical driver 37 may be disposed on the glass substrate 31 to the right of the display section 32. A CS driver 38 and a VCOM driver 39 may be disposed on the glass substrate 31 below the display section 32. These peripheral driving circuits are made with low-temperature poly-silicon or continuous grain (CG) silicon together with the pixel transistors of the display section 32.

In the liquid crystal display apparatus as described above, a master clock MCK, a horizontal synchronization pulse Hsync, a vertical synchronization pulse Vsync, and display data Data of parallel input red (R), green (G), and blue (B), all of which have a low-voltage amplitude (e.g. 3.3 V amplitude), are input to the glass substrate 31 from the outside of the substrate through a flexible cable (substrate) 40 and their levels are shifted (converted) to a high-voltage amplitude (e.g. 6.5 V) in the interface circuit 33.

The level-shifted master clock MCK, horizontal synchronization pulse Hsync, and vertical synchronization pulse Vsync are supplied to the timing generator 34. The timing generator 34 generates various timing pulses required for driving the reference voltage driver 35, the horizontal driver 36, the vertical driver 37, the CS driver 38, and the VCOM driver 39 based on the master clock MCK, the horizontal synchronization pulse Hsync, and the vertical synchronization pulse Vsync. The level-shifted display data Data is reduced to a low-voltage amplitude of 0 V to 3.3 V and is supplied to the horizontal driver 36.

The horizontal driver 36 may include a horizontal shift register 361, a data-sampling latch circuit 362, and a digital-to-analog (DA) conversion circuit (DAC) 363. The horizontal shift register 361 performs a shift operation in response to a horizontal start pulse HST supplied from the timing generator 34 and generates sampling pulses, each of which is successively transferred in one horizontal period, in synchronism with a horizontal clock pulse HCK supplied from the timing generator 34.

The data-sampling latch circuit 362 successively samples the display data Data supplied from the interface circuit 33 in synchronism with the sampling pulses generated in the horizontal shift register 361 every horizontal period and latches the sampled display data Data. This latched digital data for one line is further sent to a line memory (not shown) in a horizontal blanking period. Then, this digital data for one line is converted to analog display signals in the DA conversion circuit 363.

The DA conversion circuit 363 may have such a structure that it selects a reference voltage corresponding to the digital data from reference voltages corresponding to the number of gradations supplied from the reference voltage driver 35 and outputs the selected reference voltage as the analog display signals. The analog display signals Sig for one line, which are output from the DA conversion circuit 363, are output to n data lines 55-1 to 55-n, corresponding to the number n of horizontal pixels of the display section 32.

The vertical driver 37 includes a vertical shift register and a gate buffer. In this vertical driver 37, the vertical shift register performs a shift operation in response to a vertical start pulse VST supplied from the timing generator 34 and generates scanning pulses, each of which is successively transferred in one vertical period, in synchronism with a vertical clock pulse VCK supplied from the timing generator 34. These generated scanning pulses are successively output to m gate lines 54-1 to 54-m, corresponding to the number m of vertical pixels of the display section 32, through the gate buffer.

When the scanning pulses are successively output to the gate lines 54-1 to 54-m by this vertical scanning of the vertical driver 37, the pixels of the display section 32 are selected line by line in sequence. The analog display signals Sig for one line output from the DA conversion circuit 363 are sequentially written in the selected pixels for one line through the data lines 55-1 to 55-n. Such a writing operation is repeated for every line, resulting in display for one screen.

The CS driver 38 generates the CS electric potential described above and provides it to the other electrode of the storage capacitor 53 through the CS line 57 shown in FIG. 4. This provision is common to each pixel. Assuming that the display signals have an amplitude of 0 V to 3.3 V, the CS electric potential repeats an alternating-current inversion between a low level of 0 V (ground level) and a high level of 3.3 V when the VCOM inversion driving is adopted.

The VCOM driver 39 generates the VCOM electric potential described above. The VCOM electric potential from the VCOM driver 39 is output to the outside of the glass substrate 31 through the flexible cable 40 and is then transferred to a VCOM adjustment circuit 41. This VCOM electric potential is sent back to the glass substrate 31 through the flexible cable 40 and is then supplied to the opposite electrode of the liquid crystal cell 52 through the VCOM line 56 shown in FIG. 4. This supply is common to each pixel.

The VCOM electric potential is an alternating voltage that has substantially the same amplitude as the CS electric potential. In practice, however, since a voltage drop occurs in the TFT 51 resulting from a parasitic capacitance or the like while signals are written in the pixel electrode of the liquid crystal cell 52 from the data line 54 through the TFT 51, the VCOM electric potential must be an alternating voltage that is DC-shifted corresponding to the voltage drop, as shown in FIG. 4.

This DC shift of the VCOM electric potential is carried out in the VCOM adjustment circuit 41.

The VCOM adjustment circuit 41 includes a capacitor C, a variable resistance VR, which is connected between an output terminal of the capacitor C and an external power supply VCC, and a resistance R, which is connected between the output terminal of the capacitor C and ground. The VCOM adjustment circuit 41 adjusts a DC level of the VCOM electric potential supplied to the opposite electrode of the liquid crystal cell 52; in other words, the VCOM adjustment circuit 41 applies a DC offset to the VCOM electric potential.

In the liquid crystal display apparatus described above, peripheral circuits, such as the interface circuit 33, the timing generator 34, the reference voltage driver 35, the CS driver 38, and the VCOM driver 39, in addition to the horizontal driver 36 and the vertical driver 37, are integrally disposed on the same panel (the glass substrate 31) as the display section 32 so that a display panel integrating all driving circuits is achieved. Such a display panel does not require another substrate, an integrated circuit, or another transistor circuit, on the outside, thus miniaturizing the overall system and reducing costs.

In this driving-circuit-integrated liquid crystal display apparatus, the timing generating circuit of the embodiment described above is used as the timing generator 34 generating various timing signals for driving the display section 32. The timing generator 34 comprised by the timing generating circuit generates various timing pulses, such as horizontal start pulses HST and horizontal clock pulses HCK for driving the horizontal driver 36, vertical start pulses VST and vertical clock pulses VCK for driving the vertical driver 37, or pulses necessary for the CS driver 38 or the VCOM driver 39.

The timing generating circuit of the embodiment described above is used as the timing generator 34 so that the timing generating circuit has a wide operating margin even when transistors having wide variations in their device properties and a large process rule are used for forming each circuit on the glass substrate. Therefore, the liquid crystal display apparatus, which TFTs are used for forming the peripheral driving circuits integrally formed on the transparent insulating substrate with the display section 32, has a wide operating margin. Additionally, the timing generating circuit enables a reduction in power consumption and a small layout area when the TFTs that have a large process rule are used, thus contributing to the low power consumption and the small size of the liquid crystal display apparatus.

This application is described with an illustration applied to a liquid crystal display apparatus that uses liquid crystal cells as display elements, but the present invention is not limited to this application. The present invention is applicable to display apparatuses having a level shift circuit disposed on the same substrate as a display section, such as electroluminescent (EL) display apparatuses using EL elements as the display elements.

The display apparatus typified by the liquid crystal display apparatus of the application described above is suitable for a display screen component of compact and lightweight portable terminals such as mobile phones or personal digital assistants (PDAs).

Figure 5:
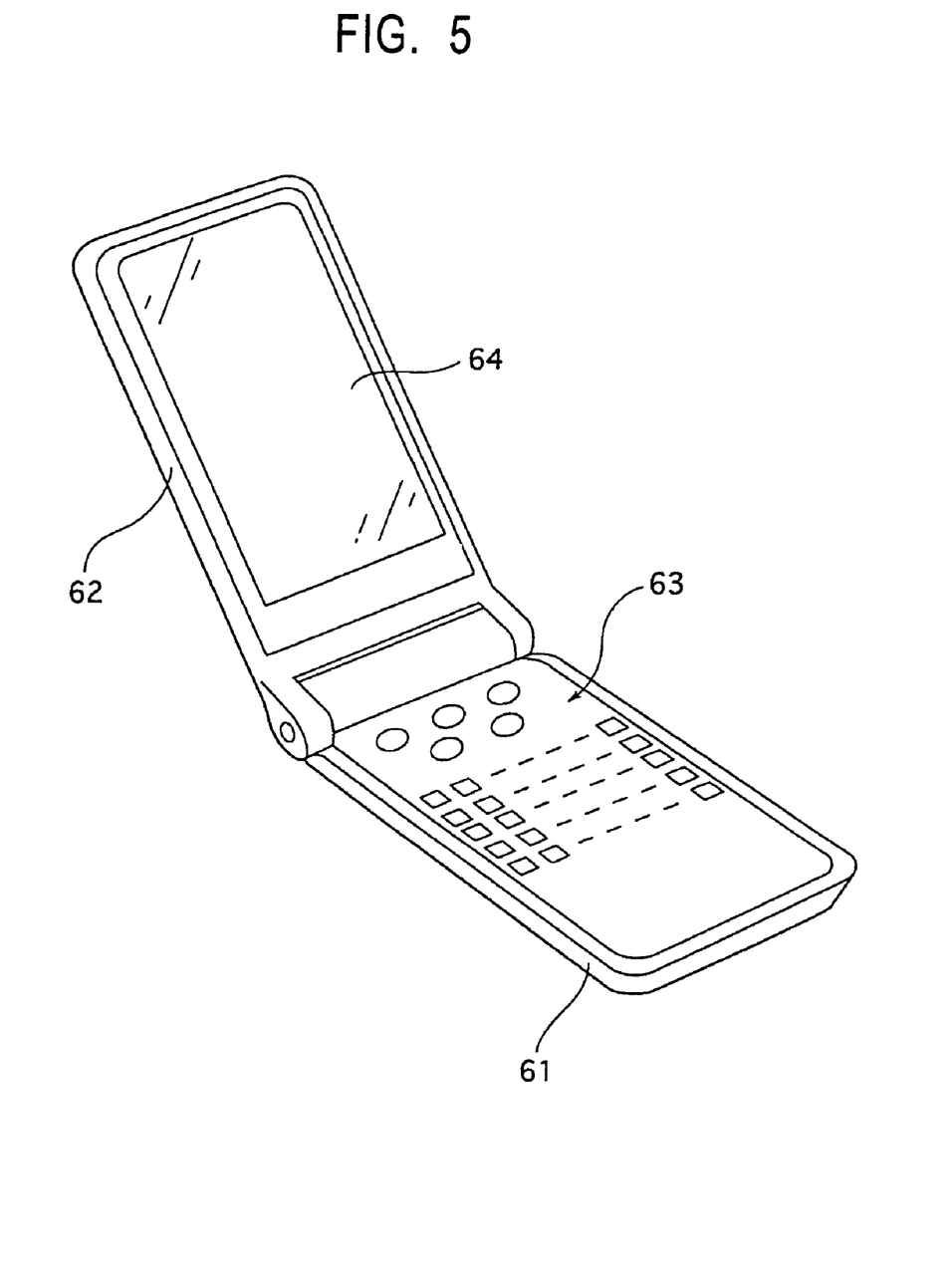
FIG. 5 is an external view showing the schematic structure of a PDA of the present invention.

FIG. 5 is an external view showing the schematic structure of the portable terminal of the present invention, for example, a PDA.

The PDA of the present invention may have a folding structure in which an openable lid component 62 is attached to a main body 61. The top face of the main body 61 has an operating section 63 consisting of various keys of a keyboard or the like. The lid component 62 has a display screen component 64. The display screen component 64 is a liquid crystal display apparatus that has the timing generating circuit of the embodiment described above, disposed on the same substrate as the display section, as the timing generator.

The use of the timing generating circuit of the embodiment as the timing generator of the liquid crystal display apparatus allows the liquid crystal display apparatus to have a structure in which driving circuits are integrated, a wide operating margin, low power consumption, and compact design. This liquid crystal display apparatus is used as the display screen component 64, permitting a simplified structure, miniaturization, and cost reduction of the PDA. Additionally, this also permits low power consumption of the display screen component 64, resulting in increased duration for continuous use by battery-powered operation.

The application to the PDA is described by way of example, but the present invention is not limited to this application. The liquid crystal display apparatus of the present invention is particularly suitable for general compact and lightweight portable terminals such as mobile phones.

As described above, according to the present invention, in the timing generating circuit formed on the insulating substrate and generating the multiple timing signals having different frequencies based on the input master clock, the operating clock having a lower frequency than the master clock frequency is generated and then the multiple timing signals are generated based on this generated operating clock having the lower frequency. This achieves a lower operating speed, leading to stable operation and reduced power consumption. Further, the counter section is formed with a small number of steps so that a small layout area is achieved even when the circuits are formed including transistors having wide variations in their device properties and a large process rule on the insulating substrate.

The invention claimed is:

1. A method of generating a timing signal comprising:
providing an operating clock based on an input master clock, the operating clock having a lower frequency than the master clock frequency; generating multiple timing signals having different frequencies based on the operating clock; and
providing a counter section having multiple cascaded shift registers, the counter section performing count operations in synchronism with the operating clock; and providing a signal generating section that generates multiple timing signals according to combinations of shifted pulses output from the multiple shift registers.

2. The method of generating a timing signal according to claim 1 wherein the counter section performs the count operations in response to start pulses generated in a predetermined period.

3. A method of driving a display apparatus comprising:
providing a display section having a matrix of pixels substrate; and
providing a timing generating circuit and
generating circuit generating multiple timing signals having different frequencies required for driving the display section in synchronism with a master clock,
generating an operating clock based on the master clock, the operating clock having a lower frequency than the master clock frequency;
generating multiple timing signals based on the operating clock; and
providing a counter section in which multiple shift registers are cascaded, the counter section performing count operations in synchronism with the operating clock generated by the clock generating means; and providing a signal generating section that generates the multiple timing signals according to combinations of shifted pulses output from the multiple shift registers.

4. The method of driving a display apparatus according to claim 3, wherein the counter section performs the count operations in response to start pulses generated in a predetermined period.

5. The method of driving a display apparatus according to claim 3 wherein the timing generating circuit is formed on a transparent insulating substrate using low-temperature polysilicon or continuous grain silicon.

6. A method for generating a display signal for a portable terminal comprising a display screen component including:
providing a display section having a matrix of pixels arranged on a transparent insulating substrate; and
generating multiple timing signals having different frequencies required for driving the display section in synchronism with a master clock,
generating an operating clock having a lower frequency than the master clock frequency based on the master clock;
generating the multiple timing signals based on the operating clock; and
providing a counter section in which multiple shift registers are cascaded, the counter section performing count operations in synchronism with the operating clock; and
generating multiple timing signals according to combinations of shifted pulses output from the multiple shift registers.

* * * * *